United States Patent
Hironaka et al.

(10) Patent No.: US 7,235,509 B2
(45) Date of Patent: Jun. 26, 2007

(54) PROCESSES FOR THE RECOVERY AND RECYCLING OF BORON TRIFLUORIDE OR COMPLEXES THEREOF

(75) Inventors: Yoshio Hironaka, Chiba (JP); Hiroki Sekiguchi, Chiba (JP); Yukio Yoshida, Chiba (JP); Toshiyuki Tsubouchi, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/532,726

(22) PCT Filed: Oct. 27, 2003

(86) PCT No.: PCT/JP03/13714

§ 371 (c)(1),
(2), (4) Date: Apr. 27, 2005

(87) PCT Pub. No.: WO2004/037412

PCT Pub. Date: May 6, 2004

(65) Prior Publication Data

US 2005/0272597 A1   Dec. 8, 2005

(30) Foreign Application Priority Data

Oct. 28, 2002 (JP) ............................. 2002-312141
Dec. 18, 2002 (JP) ............................. 2002-366808

(51) Int. Cl.
*B01J 31/00* (2006.01)
(52) U.S. Cl. .................................................. 502/150
(58) Field of Classification Search ................ 502/150
See application file for complete search history.

(56) References Cited

U.S. PATENT DOCUMENTS

| | | | | |
|---|---|---|---|---|
| 3,988,424 A | | 10/1976 | Fujiyama et al. | |
| 4,400,565 A | * | 8/1983 | Darden et al. | 585/10 |
| 5,345,024 A | * | 9/1994 | Scharf | 585/532 |
| 5,489,721 A | * | 2/1996 | Sowerby et al. | 585/532 |
| 5,811,616 A | * | 9/1998 | Holub et al. | 585/504 |
| 6,075,174 A | * | 6/2000 | Presedo | 585/525 |
| 6,147,271 A | * | 11/2000 | Strebel et al. | 585/520 |
| 6,462,151 B1 | * | 10/2002 | Takashima et al. | 526/69 |
| 7,005,537 B2 | * | 2/2006 | Mozeleski et al. | 560/233 |

FOREIGN PATENT DOCUMENTS

| | | |
|---|---|---|
| JP | 50-62927 | 5/1975 |
| JP | 55-167045 | 12/1980 |
| WO | 00/26261 | 5/2000 |

\* cited by examiner

*Primary Examiner*—Paul Marcantoni
(74) *Attorney, Agent, or Firm*—Oblon, Spivak, McClelland, Maier & Neustadt, P.C.

(57) ABSTRACT

The invention provides processes for the recovery of a catalyst which are to be applied to the reactions wherein boron trifluoride or a complex thereof is used as the catalyst, that is, (I) a process for the recovery of a catalyst which comprises using as the reaction solvent a solvent containing a hydrofluorocarbon compound and/or an oxygenic hydrofluorocarbon compound and, after the completion of the reaction, separating the reaction solvent from the reaction mixture; and (II) a process for the recovery of a catalyst which comprises extracting boron trifluoride or a complex thereof from the reaction mixture after the completion of the reaction by using a hydrofluorocarbon compound and/or an oxygenic hydrofluorocarbon compound as the extracting solvent. According to the processes, boron trifluoride or complexes thereof used as catalyst can be easily separated from the reaction mixtures and re-used.

23 Claims, No Drawings

PROCESSES FOR THE RECOVERY AND RECYCLING OF BORON TRIFLUORIDE OR COMPLEXES THEREOF

TECHNICAL FIELD

The present invention relates to processes for the recovery and recycling of boron trifluoride or a complex thereof, and more particularly, it relates to processes for the recovery and reusing of a solvent containing boron trifluoride or the complex thereof after completion of a reaction, wherein boron trifluoride or the complex thereof is used as a catalyst in the reaction manufacturing compounds by alkylation, condensation reaction, oligomerization reaction, polymerization reaction, condensation reaction, and isomerization reaction of olefin, and in manufacturing petroleum resins and chromane-indene resins.

BACKGROUND ART

Boron trifluoride or a boron trifluoride complex consisting of boron trifluoride and a complexing agent (ligand) is well known as a so-called Friedel-Crafts catalyst and has excellent catalyst performance of suppressing side reactions and promoting only main reactions effectively as compared with $AlCl_3$, $FeCl_3$, sulfuric acid and the like. Therefore, boron trifluoride and its various complexes are industrially used widely as a catalyst in various chemical reactions such as alkylation, isomerization, polymerization, dimerization, condensation, addition, decomposition, dehydration, etc.

Main industrial use of boron trifluoride includes a catalyst in manufacturing ethylbenzene by gas phase alkylation from ethylene and benzene. Alkylbenzenes used for synthetic detergents or anti-oxidants are manufactured by liquid phase alkylation reaction of olefins and aromatics, where boron trifluoride or its complexes is also used as the catalyst in the manufacture.

Furthermore, boron trifluoride or its complexes is also used as a polymerization catalyst in manufacturing petroleum resins and chromane-indene resins, which are widely used in the fields such as adhesives and printing ink, and when this catalyst is used, it has the effect that there is less deterioration of a product and corrosion of equipment. As mentioned above, boron trifluoride or its complexes is a catalyst provided for various uses as a manufacturing catalyst in chemical industry.

A catalyst comprising boron trifluoride or a boron trifluoride complex consisting of boron trifluoride and a complexing agent is used, depending on the reaction of interest, in the form of boron trifluoride alone or a complex in which various compounds are coordinated to boron trifluoride at an appropriate ratio. It is general that boron trifluoride is deactivated to separate a reaction product and a catalyst after completion of the reaction in which boron trifluoride or its catalyst is used. For separation of the reaction product and the catalyst, a process of washing the reaction product by adding water to the reaction solution to deactivate boron trifluoride and a process of washing the reaction product after neutralizing the reaction solution by basic aqueous solutions such as ammonia, sodium hydroxide, and lime are usually adopted.

However, since the waste water containing fluorides or boron, composed of a hydrate of boron trifluoride or a neutralized product of boron trifluoride in high concentrations, is discharged in the washing process or the neutralizing process, it is recently desired to take measures for removal of the waste water containing fluorides or boron in consideration of the problem of environmental pollution. In particular, since it is difficult by the present technology for waste-water treatment to remove boron easily, and since it is costly to remove boron completely, it is desired to remove boron at a low cost. Furthermore, since boron trifluoride is expensive, it is expected to recover and reuse the removed boron trifluoride.

In the condensation reaction of olefin using boron trifluoride or boron trifluoride complexes as a catalyst, even if the reaction product solution is allowed to stand, the boron trifluoride complex is almost dissolved in the reaction product or forms an emulsion, and hence it is difficult to completely separate the reaction product and the boron trifluoride complex catalyst. Therefore, boron trifluoride is removed from the reaction product by washing with water or a basic aqueous solution. However, if water or the basic solution is added to the boron trifluoride complex, the boron trifluoride catalyst forms a water complex such as $BF_3 \cdot (H_2O)_n$, or a boron trifluoride salt, and cannot be repeatedly used as a catalyst without change. Although a process of separating the catalyst layer and the reaction product using a complex of $BF_3$ with phosphoric acid, acetic acid or phenol is also disclosed (for example, refer to Japanese Patent Application Laid-open No. Heisei02(1990)-45429 (p1–6)), the reaction proceeds only slowly unless the catalyst concentration is 10% or more. Moreover, separation of the reaction product and the catalyst is inadequate and the amount of the catalyst that can be reused is limited. Moreover, since the catalyst acts as a Broensted acid, side reactions such as isomerization occur, and consequently the aforementioned process of separation cannot be adopted particularly for the condensation dimerization reaction of olefin.

Conventionally, there is disclosed a process for the recovery of boron trifluoride, wherein the reaction product solution containing boron trifluoride or a boron trifluoride complex is contacted with calcium fluoride ($CaF_2$) at the temperature of 200° C. or less, the generated calcium tetrafluoroborate ($Ca(BF_4)_2$) is heated at the temperature between 100 and 600° C., and boron trifluoride is recovered by obtaining boron trifluoride and calcium fluoride (for example, refer to Japanese Patent Application Laid-open No. 2000-109313 (p1–9)).

Similarly, there is disclosed a process for the recovery of boron trifluoride by generating tetrafluoroborate using a fluoride such as lithium fluoride, strontium fluoride, and barium fluoride and heating at the temperature between 100 and 600° C. (for example, refer to Japanese Patent Application Laid-open No. 2000-128522 (p1–9), Japanese Patent Application Laid-open No. 2000-135402 (p1–9), and Japanese Patent Application Laid-open No. 2000-135403 (p1–9)).

However, in the reaction using boron trifluoride as a catalyst, it is necessary to react at low temperature below room temperature in many cases. Moreover, when the temperature is raised to around 100° C. after completion of the reaction, at which tetrafluoroborate is synthesized advantageously, a side reaction occurs and causes decrease in the yield or lowering of the quality of a reaction product of interest. The complex is hardly formed below room temperature. Moreover, decomposition reaction by heating at high temperature is not desirable from a viewpoint of energy saving.

Moreover, there is a problem that, when the reaction product solution is viscous, it is difficult to separate the reaction product completely from borates such as calcium tetrafluoroborate, which takes time and effort.

A process for the recovery of boron trifluoride complexes is also disclosed, wherein the boron trifluoride complex is precipitated and separated from a nonconducting fluid by applying direct current and/or alternating voltage to the nonconducting fluid in which boron trifluoride is dispersed and/or dissolved and subsequent warming of the separated complex (for example, refer to Japanese unexamined patent publication (Kokai) No. 2001-104805 (p1–11)).

However, in this process for the recovery, it is necessary to continue to apply a voltage of several hundreds of volts from an external power supply for 30 minutes or more after completion of the reaction. Since the reaction proceeds further and a side reaction occurs if the voltage supply is continued, a process for stopping the reaction is required. There is also a problem that the boron trifluoride complex dissolved in the reaction mixture is not always separated. In addition, it was necessary to provide an electric equipment system, and it was difficult to completely separate the boron trifluoride complex by this recovery process.

DISCLOSURE OF THE INVENTION

The present invention was carried out in view of the aforementioned situation, and an object of the present invention is to provide a process to separate and remove a compound containing expensive and harmful boron trifluoride from a reaction product containing boron trifluoride or its complex at high efficiency and to reuse it for the reaction.

To resolve the aforementioned object, the present inventors carried out researches extensively and found a solvent system which dissolves boron trifluoride or its complex and does not dissolve an olefin with relatively high molecular weight, and found that recycling of a catalyst system was possible in a condensation reaction of the olefin. Moreover, the present inventors found, in a reaction using boron trifluoride or its complex as a catalyst, an epoch-making process to separate and remove a compound containing expensive and harmful boron trifluoride at high efficiency from a reaction product containing boron trifluoride or its complex using the aforementioned specific solvent, and to reuse it for the reaction as a catalyst.

Namely, the present inventors found that, by using a hydrofluorocarbon compound as a solvent, the amount of the catalyst carried into the product system was reduced and that the amount of a by-product was also decreased. Moreover, the present inventors found that the reaction product and the catalyst were easily separable by using the hydrofluorocarbon compound as an extracting solvent.

The present invention has been completed based on the above knowledge.

Namely, the present invention provides, in a reaction using boron trifluoride or its complex as a catalyst, a process for the recovery of the catalyst (I) characterized in that a reaction product and a reaction solvent are separated after completion of the reaction by using a solvent containing a hydrofluorocarbon compound and/or an oxygenic hydrofluorocarbon compound as the reaction solvent; and a process for recycling of the catalyst characterized by reusing the catalyst recovered by this process for the reaction.

Moreover, the present invention provides, in a reaction using boron trifluoride or its complex as a catalyst, a process for the recovery of the catalyst (II) characterized in that boron trifluoride or its complex is extracted from a reaction product after completion of the reaction by using a hydrofluorocarbon compound and/or an oxygenic hydrofluorocarbon compound as an extracting solvent; and a process for the recycling of the catalyst characterized by reusing the catalyst recovered by this process for the reaction.

DETAILED DESCRIPTION OF THE PREFERRED EMBODIMENTS

In a process of the recovery of the catalyst (I) according to the present invention, in various chemical reactions that use boron trifluoride or its complex as a catalyst, such as alkylation reaction, condensation of olefin, oligomerization, polymerization, isomerization, decomposition, and dehydration, a solvent is used as a reaction solvent, wherein the solvent disperses and/or dissolves at least a part of boron trifluoride or its complex, and contains a hydrofluorocarbon compound and/or an oxygenic hydrofluorocarbon compound with properties of forming an interface between a reaction product of interest and the solvent system. By using such reaction solvent, a solvent layer containing boron trifluoride or its complex and a reaction product layer can be formed simply by allowing the reaction solution to stand after completion of the reaction, and the reaction product and the catalyst can be separated. Then, the reaction product layer can be transferred to a post-treatment system and the catalyst layer can be returned to the same reaction system to be reused as a catalyst and a solvent.

The solvents satisfying the aforementioned conditions include hydrofluorocarbon compounds, azeotropes of hydrofluorocarbon compounds, a mixture of a hydrofluorocarbon compound and a perfluorocarbon compound, and ether compounds which are oxygenic hydrofluorocarbon compounds. Hydrofluorocarbon compounds are a kind of fluorocarbon compounds with no ozone-depleting potential, no effects on the ozone layer of the stratosphere, and having hydrogen groups.

Hydrofluorocarbon compounds include the compounds expressed by a composition formula $C_nH_mF_{2n-m+2}$ (n=3 to 12, and m=1 to 2n). However, gaseous compounds at room temperature are excluded because it is necessary to liquefy them by pressurizing during treatment. Since the boiling point is high when n exceeds 12, handling becomes complicated. Moreover, their availability also decreases.

Hydrofluorocarbon compounds with a composition formula of $C_nH_mF_{2n-m+2}$ include 1,1,1,2,3,4,4,5,5,5-decafluoropentane ($C_5H_2F_{10}$) (HFC-43-10mee), 1,1,1,2,2,3,3,4-octafluorobutane ($C_4H_2F_8$), 1,1,1,3,3-pentafluorobutane ($C_4H_5F_5$), 1,1,1,4,4,4-hexafluorobutane ($C_4H_4F_6$), 1H-perfluoroheptane ($C_7H_3F_5$), 1H-perfluorohexane ($C_6HF_{13}$), 1H,1H,2H-perfluorooctane ($C_8H_3F_{15}$), 1H,2H-perfluorooctane ($C_8H_2F_{16}$), 1,1,2,2,3-pentafluoropropane ($C_3H_3F_5$) and the like. Cyclic perfluorohydrocarbon compounds with the number of carbon atoms of 12 or less, in which fluorine atoms are partially substituted with hydrogen atoms (for example, 1,1,2,2,3,3,4-heptafluorocyclopentane ($C_5H_3F_7$), 2H,3H-perfluorodecalin ($C_{10}H_2F_{16}$)), can also be used.

Oxygenic hydrofluorocarbon compounds include compounds with a composition formula expressed as $C_nH_mF_{2n-m+2}O$ (n=3 to 12, and m=1 to 2n). Specifically, they include bis(2,2,2-trifluoroethyl)ether and heptafluoropropyl-1,2,2,2-tetrafluoroethylether ($C_5HF_{11}O$). Oxygenic cyclic perfluorohydrocarbon compounds with the number of carbon atoms of 12 or less, in which fluorine atoms are partially substituted with hydrogen atoms, can also be used.

It is considered presently that a cause of depletion of the stratospheric ozone layer is fluorocarbon. To prevent that, a solvent without a possibility of ozone layer depletion should be used. The aforementioned hydrofluorocarbon compounds satisfy this requirement.

The amount of the solvent containing hydrofluorocarbon compounds and/or oxygenic hydrofluorocarbon compounds used in the process for the recovery of the catalyst (I) according to the present invention is preferably between 10 and 500 parts by mass with respect to 100 parts by mass of a raw material, and more preferably between 50 and 200 parts by mass. When excessive amount of the solvent is used, the volume of the reaction becomes large and control of stirring and temperature becomes difficult, giving rise to a cost rise. When too little amount of the solvent is used, it takes time to separate the catalyst.

The solvent used in the process for the recovery of the catalyst (I) according to the present invention may be a mixed solvent in which a fluorine compound with a specific gravity of 1.1 or more is added to the aforementioned hydrofluorocarbon compound and/or oxygenic hydrofluorocarbon compound. The fluorine compounds with the specific gravity of 1.1 or more include perfluoro compounds, perfluorooctane, perfluorohexane, perfluoro polyether, and the like. When the specific gravity is less than 1.1, it takes time to separate a reaction product from a solvent layer and it is hard to separate. Moreover, if a solvent which forms a complex with boron trifluoride is used, this may have a possibility to act as a new catalyst system and may affect the structure and the formula of the reaction product. Moreover, it also becomes a cause of a side reaction.

The amount of the fluorine compound with the specific gravity of 1.1 or more is preferably between 0 and 100 parts by mass with respect to 100 parts by mass of a hydrofluorocarbon compound and/or an oxygenic hydrofluorocarbon compound, and more preferably between 10 and 50 parts by mass. Although addition of the fluorine compound with the specific gravity of 1.1 or more improves the separation, excessive addition tends to decrease the recovery of the catalyst.

In the process for the recovery of the catalyst (I) according to the present invention, boron trifluoride compounds used as a catalyst include boron trifluoride gas, boron trifluoride-ethyl ether complex, boron trifluoride-methyl ether complex, boron trifluoride-ethyl methyl ether complex, boron trifluoride-butyl ether complex, boron trifluoride-phenol complex, boron trifluoride-alkylamine complex, boron trifluoride-ammonia complex, boron trifluoride-piperidine complex, boron trifluoride-triethanolamine complex, boron trifluoride-alcohol complex, boron trifluoride-ketone complex, boron trifluoride-aldehyde complex, boron trifluoride-ester complex, boron trifluoride-acid anhydride complex, boron trifluoride-acid complex, boron trifluoride-$(H_2O)_n$ complex (n=1 to 5), and the like.

It is important to reduce the amount of waste by reusing the boron trifluoride complex, which is difficult to treat for waste. A solvent layer containing a catalyst, which is separated from a reaction product according to the process of the present invention, can be reused as a reaction solvent without treatment. However, an impurity may be accumulated into the reaction solvent by repeated use due to the influence of the impurity or moisture in a raw material. In this case, the boron trifluoride-ether complex and the hydrofluorocarbon compound may be taken out by distilling the reaction solvent. Moreover, purification may be performed by passing the reaction solvent through an activated carbon column to adsorb the impurity.

On the other hand, in a process for the recovery of the catalyst (II) according to the present invention, in various chemical reactions that use boron trifluoride or its complex as a catalyst, such as alkylation reaction, condensation, oligomerization, polymerization, isomerization, decomposition, and dehydration of olefin, a solvent is used as an extracting solvent, wherein the solvent disperses and/or dissolves at least a part of boron trifluoride or its complex in a mixture of the reaction product, the unreacted raw material, and the used catalyst, and contains a hydrofluorocarbon compound and/or an oxygenic hydrofluorocarbon compound with properties of forming an interface between the reaction product of interest and the solvent system. By adding the aforementioned extracting solvent after completion of the reaction and allowing the resultant solution to stand after stirring, a solvent layer containing boron trifluoride or its complex and a reaction product layer can be formed, and the reaction product and the catalyst can be separated. Then, the reaction product layer can be transferred to a post-treatment system and the solvent layer containing the catalyst can be returned to the same reaction system to be reused as a catalyst by separating boron trifluoride or its complex by distillation. Also, the solvent layer can be reused for the reaction without distilling while containing the extracting solvent.

Extracting solvents satisfying the aforementioned conditions include the similar solvents illustrated in the aforementioned process for the recovery of the catalyst (I).

The amount of the extracting solvent containing a hydrofluorocarbon compound and/or an oxygenic hydrofluorocarbon compound used in the process for the recovery of the catalyst (II) of the present invention is preferably between 10 and 500 parts by mass with respect to 100 parts by mass of a raw material, and more preferably between 50 and 200 parts by mass. Although the extraction efficiency is better if the whole amount of the extracting solvent is added portionwise, extraction in two or three portions is preferable because it takes time to separate into two layers if the portion to be added at each time is small. The extraction temperature is preferably below the room temperature.

Extracting solvents used in the process for the recovery of the catalyst (II) of the present invention may be a mixed solvent in which a fluorine compound with the specific gravity of 1.1 or more is added to the aforementioned hydrofluorocarbon compound and/or oxygenic hydrofluorocarbon compound. Since specific examples and the amount of use of fluorine compounds with the specific gravity of 1.1 or more are the same as that in the aforementioned process for the recovery of the catalyst (I), its explanation is omitted.

Boron trifluoride compounds used as a catalyst in the process for the recovery of the catalyst (II) of the present invention include the same compounds as those illustrated in the aforementioned process for the recovery of the catalyst (I).

In a reaction using boron trifluoride or its complex as a catalyst, when the boron trifluoride or its complex is extracted from a reaction product by using the aforementioned extracting solvent after completion of the reaction, an upper layer containing a target reaction product and a lower layer containing a catalyst are separated. To separate this lower layer extract into the extracting solvent and the boron trifluoride or its complex by distillation, a solvent used as a complexing agent such as ethyl ether may be add to the extract and the resultant mixture is stirred, which was then subjected to distillation by a well-known process.

It is important to reuse the boron trifluoride complex, that is difficult to treat for waste, by extraction and separation, and to reduce the amount of waste.

The present invention will be explained further specifically by Examples and Comparative Examples below, however, the present invention is by no means limited to these Examples.

EXAMPLE 1

Recovery of the Catalyst

A mixture which was manufactured as a raw material of a synthetic lubricating oil and contained 55 mass % in total of 2-methylene-3-methyl-bicyclo[2.2.1]heptane and 3-methylene-2-methyl-bicyclo[2.2.1]heptane, 30 mass % of 2,3-dimethyl-bicyclo[2.2.1]hept-2-ene, and its structural isomers, was prepared as a raw material and a dimerization reaction was performed as follows.

A reaction solution was prepared by putting 8 g of boron trifluoride-diethyl ether complex, 400 g of 1,1,1,2,3,4,4,5,5,5-decafluoropentane (HFC-43-10mee), and 400 g of the aforementioned raw material in a flask having four separate necks with an internal volume of 1 L, and the dimerization reaction was performed at 10° C. for 6 hours with stirring using a mechanical stirrer. After completion of the reaction, the reaction solution was transferred to a separatory funnel and allowed to stand for 20 minutes at the temperature kept between 10 and 15° C. As two layers were separated, a light yellow and almost transparent HFC solution was collected from the lower layer. The upper layer was a slightly light yellow and transparent liquid. The upper layer was washed with distilled water and saturated brine, dried with Glauber's salt, and 390 g of a target dimer mixture of the olefin compound was obtained.

When the percent conversion was determined by gas chromatography, it was 85%. When the boron concentration of the light yellow transparent liquid of the upper layer was examined, it was 0.0025 mass % (25 ppm) or less, which was below the limit of detection. The boron concentration of the catalyst solution of the lower layer was 0.145 mass %, indicating that 97 mass % of the boron trifluoride-diethyl ether complex added was recovered (the theoretical boron concentration: 0.15 mass %).

EXAMPLE 2

Recycling of the Catalyst

Three gram of HFC-43-10mee was added to the catalyst solution, which was collected from the lower layer in Example 1, to make up the weight of HFC-43-10mee 400 g. A reaction solution was prepared by adding the catalyst solution containing 400 g of HFC-43-10mee and 400 g of the raw material, which is the same as that in Example 1, and a dimerization reaction was performed at 10° C. for 6 hours with stirring using a mechanical stirrer. When a post-treatment was carried out in the same manner as in Example 1 after completion of the reaction, 384 g of the target dimer mixture was obtained.

When the percent conversion was determined by gas chromatography, it was 82%. A brown and almost transparent catalyst solution was obtained from the lower layer. Dimerization reaction was performed using this catalyst solution. The catalyst solution was recovered from the lower layer. Even if dimerization reaction was repeated three times using this catalyst solution, the reaction proceeded. When the percent conversion was determined by gas chromatography after the fifth dimerization reaction was completed, it was 77%. After the fifth dimerization reaction was completed, the catalyst solution was also recovered from the lower layer. The boron concentration of this catalyst solution was 0.115 mass %, indicating that 76 mass % of the boron trifluoride-diethyl ether complex added initially was recovered.

EXAMPLE 3

Dimerization reaction was performed under the same conditions as in Example 1 except that the amount of HFC-43-10mee used was changed to 100 g from 400 g in Example 1. After completion of the reaction, the same post-treatment as in Example 1 was performed and 389 g of the target dimer mixture was obtained. When the percent conversion was determined by GC, it was 90%. The boron concentration of the catalyst solution obtained from the lower layer was 0.48 mass %, indicating that 85 mass % of the boron trifluoride-diethyl ether complex added was recovered.

EXAMPLE 4

Dimerization reaction was performed under the same conditions as in Example 1 except that a mixture of 300 g of HFC-43-10mee and 100 g of perfluorohexane was used as a solvent instead of 400 g of HFC-43-10mee in Example 1.

After completion of the reaction, the solution was transferred to a separatory funnel and was allowed to stand for 5 minutes at the temperature kept between 10 and 15° C. As two layers were separated, a light yellow and almost transparent catalyst solution was collected from the lower layer. The upper layer was a slightly light yellow and transparent liquid. The upper layer was washed with distilled water and saturated brine, dried with Glauber's salt, and 378 g of the dimer mixture of interest was obtained.

When the percent conversion was determined by gas chromatography, it was 88%. When the boron concentration of the light yellow transparent liquid of the upper layer was examined, it was 0.0025 mass % (25 ppm) or less, which was below the limit of detection. The boron concentration of the lower layer catalyst solution was 0.14 mass %, indicating that 93 mass % of the boron trifluoride-diethyl ether complex added was recovered.

EXAMPLE 5

A reaction solution was prepared by putting 0.8 g of boron trifluoride-diethyl ether complex, 20 g of bis(2,2,2-trifluoroethyl)ether, and 40 g of the raw material which is the same as that in Example 1 in a flask having four separate necks with an internal volume of 300 ml, and a dimerization reaction was performed at 0° C. for 12 hours with stirring using a mechanical stirrer. After completion of the reaction, the reaction solution was transferred to a separatory funnel and was allowed to stand for 10 minutes at the temperature kept between 0 and 5° C. As two layers were separated, a light yellow and almost transparent catalyst solution was collected from the lower layer. The upper layer was a slightly light yellow and transparent liquid. The upper layer was washed with distilled water and saturated brine, dried with Glauber's salt, and 36 g of the target dimer mixture was obtained.

When the percent conversion was determined by gas chromatography, it was 74%. When the boron concentration of the light yellow transparent liquid of the upper layer was examined, it was 0.0025 mass % (25 ppm) or less, which was below the limit of detection. The boron concentration of the lower layer catalyst solution was 0.27 mass %, indicating that 92 mass % of the boron trifluoride-diethyl ether complex added was recovered.

Comparative Example 1

A dimerization reaction was performed with no solvent by using the same raw material as that in Example 1.

A reaction solution was prepared by putting 8 g of boron trifluoride-diethyl ether complex and 400 g of the raw material which is the same as that in Example 1 in a flask having four separate necks with an internal volume of 1 L, and the dimerization reaction was performed at 10° C. for 6 hours with stirring using a mechanical stirrer. Even if the reaction solution was allowed to stand after completion of the reaction, it remained as a heterogeneous dark-brown solution and was not separated into two layers. To this solution, 1 L of distilled water was added to dissolve the boron trifluoride-diethyl ether complex catalyst. Consequently, it was not possible to separate and recover the boron trifluoride-diethyl ether complex without change. The organic layer was further washed with an aqueous sodium hydrogencarbonate solution and saturated brine, dried with Glauber's salt, and 378 g of the target dimer mixture was obtained. When the percent conversion was determined by gas chromatography, it was 86%.

Comparative Example 2

A dimerization reaction was performed under the same conditions as in Example 1 using the same raw material as that in Example 1 and perfluorohexane instead of HFC-43-10mee as a solvent.

A reaction solution was prepared by putting 0.8 g of boron trifluoride-diethyl ether complex, 40 g of perfluorohexane, and 40 g of the raw material which is the same as that in Example 1 in a flask having four separate necks with an internal volume of 300 ml, and the dimerization reaction was performed at 10° C. for 6 hours with stirring using a mechanical stirrer. When the reaction solution was allowed to stand after completion of the reaction, it was separated into two layers. The upper layer was a heterogeneous and brown solution. The upper layer was washed with water, an aqueous sodium hydrogencarbonate solution and saturated brine, dried with Glauber's salt, and 39 g of the light yellow target dimer was obtained. When the percent conversion was determined by gas chromatography, it was 88%. The lower layer was a transparent liquid with 40 g in weight. When the solvent was distilled under normal pressure, there were no residues (boron trifluoride-diethyl ether complex).

EXAMPLE 6

A reaction solution was prepared by dissolving 100 g of isobutene (purity: 98%) from a gas introduction pipe in 100 g of HFC-43-10mee under a nitrogen stream in a dry ice-methanol bath at the temperature kept between −20 and −30° C. and by further adding 2 g of boron trifluoride-diethyl ether complex (1:1 mol addition product). Polymerization reaction was performed with vigorous stirring for 60 minutes. After completion of the reaction, the reaction solution was allowed to stand at the temperature kept between −20 and −30° C. Then, two layers were separated. A light yellow and transparent liquid weighing 94 g was collected from the lower-layer. After 98 g of the upper-layer liquid was washed with water and a dilute aqueous solution of sodium hydrogencarbonate, the low boiling component was removed by distillation under reduced pressure. The percent conversion of isobutene and the yield of the generated polybutene were 100 mol % and 92 mass %, respectively.

EXAMPLE 7

A reaction solution was prepared by dissolving 100 g of isobutene (purity: 98%) from a gas introduction pipe in 94 g of the lower layer liquid obtained in Example 6 while stirring at the temperature kept between −20 and −30° C. Polymerization reaction was performed with vigorous stirring for 60 minutes. When a post-treatment was performed in the same manner as in Example 6, the percent conversion of isobutene and the yield of the generated polybutene were 100 mol % and 89 mass %, respectively.

Comparative Example 3

A reaction solution was prepared by dissolving 100 g of isobutene (purity; 98%) from a gas introduction pipe in 100 g of hexane under a nitrogen stream in a dry ice-methanol bath at the temperature kept between −20 and −30° C. and further by adding 2 g of boron trifluoride-diethyl ether complex (1:1 mol addition product). Polymerization reaction was performed with vigorous stirring for 60 minutes. Even if the reaction solution was allowed to stand after completion of the reaction, it was not separated into two layers. Distilled water was added to the reaction solution and the organic layer was separated. Consequently, boron trifluoride-diethyl ether complex was decomposed and dissolved in water, and it was not possible to separate and recover the complex without change. That is, it was not possible to reuse the catalyst.

After the organic layer was washed with water and a dilute aqueous solution of sodium hydrogencarbonate, the low boiling component was removed by distillation under reduced pressure. The percent conversion of isobutene and the yield of the generated polybutene were 100 mol % and 86 mass %, respectively.

EXAMPLE 8

A mixture which was manufactured as a raw material of a synthetic lubricating oil and contained 55 mass % in total of 2-methylene-3-methyl-bicyclo[2.2.1]heptane and 3-methylene-2-methyl-bicyclo[2.2.1]heptane, 30 mass % of 2,3-dimethylbicyclo[2.2.1]hept-2-ene, and its structural isomers, was prepared as a raw material and a dimerization reaction was performed as follows.

A reaction solution was prepared by putting 8 g of boron trifluoride-diethyl ether complex and 400 g of the aforementioned raw material in a flask having four separate necks with an internal volume of 1 L, and the dimerization reaction was performed at 10° C. for 6 hours with stirring using a mechanical stirrer. Even if the reaction solution was allowed to stand after completion of the reaction, it was not separated into two layers and remained as a heterogeneous brown solution. To the solution 400 g of 1,1,1,2,3,4,4,5,5,5-decafluoropentane (HFC-43-10mee) was added with stirring for 10 minutes, and the resultant solution was allowed to stand for 10 minutes at 10° C. to obtain a light yellow supernatant liquid and a brown lower layer liquid. When the boron concentration of the supernatant liquid was examined, it was 25 mass ppm or less, which was below the limit of detection.

To the supernatant liquid, 400 ml of distilled water was added in two portions, and the resultant solution was stirred and washed to obtain a light yellow transparent organic solution. Furthermore, the organic solution was washed with an aqueous sodium hydrogencarbonate solution and saturated brine, dried with Glauber's salt, and 410 g of a target dimer mixture of the olefin compound with light yellow color was obtained.

When the percent conversion was determined by gas chromatography, it was 92%. From the lower layer, 390 g of a brown and almost transparent HFC liquid (catalyst solution) was obtained. The boron concentration of the lower layer catalyst solution was 0.147 mass %, indicating that 96 mass % of the boron trifluoride-diethyl ether complex added was recovered (the theoretical amount of boron: 0.149 mass %).

EXAMPLE 9

After 5 g of ethyl ether was added with stirring to 100 g of the lower layer catalyst solution obtained in Example 8, distillation of the resultant solution was performed under normal pressure at the boiling point between 55 and 56° C., to obtain 82 g of a transparent HFC-43-10mee liquid. Then, distillation was performed at 0.018 MPa and 1.42 g of a transparent boron trifluoride-diethyl ether complex solution was obtained at the boiling point between 75 and 80° C. A brown liquid was obtained in the residue. The recovery yield of boron trifluoride-diethyl ether complex was 71 mass %.

EXAMPLE 10

A reaction solution was prepared by putting 200 g of the raw material which is the same as that in Example 8 in a flask having four separate necks with an internal volume of 1 L, and by adding 200 g of the lower layer catalyst solution obtained in Example 8 to the flask with stirring at 10° C. at 400 rpm using a mechanical stirrer. A dimerization reaction was performed with stirring at 10° C. for 8 hours. When post-treatment was carried out in the similar manner as in Example 8 after completion of the reaction, 202 g of a target dimer mixture was obtained.

When the percent conversion was determined by gas chromatography, it was 88%. From the lower layer, 190 g of a brown and almost transparent catalyst solution was obtained. The boron concentration of the lower layer catalyst solution was 0.142 mass %, indicating that 92 mass % of the boron trifluoride-diethyl ether complex added was recovered (the theoretical amount of boron: 0.147 mass %).

EXAMPLE 11

A reaction solution was prepared by putting 0.8 g of boron trifluoride-diethyl ether complex and 40 g of a raw material which is the same as that in Example 8 in a flask having four separate necks with an internal volume of 300 mL, and a dimerization reaction was performed at 0° C. for 6 hours with continuous stirring using a mechanical stirrer. After completion of the reaction, 40 g of bis(2,2,2-trifluoroethyl) ether was added to the reaction solution, and the resultant solution was shaken vigorously and allowed to stand for 20 minutes at the temperature kept between 0 and 5° C. As the solution was separated into two layers, a brown and almost transparent catalyst solution was collected from the lower layer. The upper layer was a light yellow and transparent liquid. It was washed with distilled water and saturated brine, dried with Glauber's salt, and 40.5 g of a target dimer mixture was obtained.

When the percent conversion was determined by gas chromatography, it was 98%. When the boron concentration of the upper light yellow and transparent liquid was examined, it was 25 mass ppm or less, which was below the limit of detection. The boron concentration in 39 g of the lower layer catalyst solution was 0.148 mass %, indicating that 95 mass % of the boron trifluoride-diethyl ether complex added was recovered (the theoretical amount of boron: 0.149 mass %).

EXAMPLE 12

A reaction solution was prepared by putting 8 g of boron trifluoride-diethyl ether complex and 400 g of a raw material which is the same as that in the Example 8 in a flask having four separate necks with an internal volume of 1 L, and a dimerization reaction was performed at 10° C. for 6 hours with stirring using a mechanical stirrer. After completion of the reaction, 300 g of an HFC-43-10mee solution and 50 g of perfluorohexane (specific gravity: 1.68) were added to the reaction solution and stirring was further continued for 10 minutes. Then, the resultant solution was transferred to a separatory funnel and was allowed to stand for 10 minutes. As it was separated into two layers, a brown and almost transparent catalyst solution was collected from the lower layer. A transparent and light yellow liquid of the upper layer was a target material. When the boron concentration was examined, it was 25 mass ppm or less, which was below the limit of detection. The boron concentration in 345 g of the lower layer catalyst solution was 0.169 mass %, indicating that 96 mass % of the boron trifluoride-diethyl ether complex added was recovered (the theoretical amount of boron: 0.17 mass %).

Comparative Example 4

A reaction solution was prepared by putting 4 g of boron trifluoride-diethyl ether complex and 200 g of a raw material which is the same as that in Example 8 in a flask having four necks with an internal volume of 1 L, and a dimerization reaction was performed at 10° C. for 6 hours with vigorous stirring using a mechanical stirrer. Even if the reaction solution was allowed to stand after completion of the reaction, it was not separated into two layers and remained as a heterogeneous brown solution. To the reaction solution, 1 L of distilled water was added and the boron trifluoride-diethyl ether complex catalyst was dissolved. Consequently, it was not possible to separate and recover the boron trifluoride-diethyl ether complex without change. Further, the organic layer was washed with an aqueous sodium hydrogencarbonate solution and saturated brine, dried with Glauber's salt, and 200 g of a target dimer with light yellow color was obtained. When the percent conversion was determined by gas chromatography, it was 94%.

Comparative Example 5

Although extraction procedure was performed in the similar manner as in Example 8 using a raw material which is the same as that in Example 8 except that perfluorohexane was used instead of HFC-43-10mee as an extracting solvent, the lower layer remained transparent. The boron concentration of the lower layer was 100 mass ppm or less, indicating that the boron trifluoride-diethyl ether complex was hardly extracted.

Comparative Example 6

A reaction was performed under the same conditions as in Example 8 and 400 ml of hexane was added to the reaction solution instead of HFC-43-10mee after completion of the reaction. The reaction solution was stirred for 10 minutes and allowed to stand for 10 minutes at 10° C. Then, a light brown supernatant liquid and a dark-brown lower layer liquid were obtained. When the supernatant liquid was taken out in the air, white fumes were generated, and the presence of $BF_3$.etherate was confirmed. To the supernatant liquid 1 L of distilled water was added in two portions and the resultant solution was stirred and washed. Then, a yellow transparent organic solution was obtained. Furthermore, the organic solution was washed with an aqueous sodium hydrogencarbonate solution and saturated brine, dried with Glauber's salt, and 400 g of a target dimer with light yellow color was obtained.

When the percent conversion was determined by gas chromatography, it was 90%. 4.6 g of a dark brown and almost transparent liquid was obtained from the lower layer. When this liquid was distilled and purified in the same manner as in Example 9, 2.32 g of boron trifluoride-diethyl ether complex was recovered, which was only 29 mass % of the boron trifluoride-diethyl ether complex added initially.

INDUSTRIAL APPLICABILITY

According to the processes for the recovery of the catalyst (I) and (II) of the present invention, boron trifluoride or its complex used as a catalyst can be separated easily from a reaction product and reused. Moreover, according to the process for the recovery of the catalyst (I) of the present invention, since the catalyst and by-products that are carried into the product system can be reduced by using a hydrofluorocarbon compound as a solvent, purification of the product is made easy. According to the process for the recovery of the catalyst (II) of the present invention, a reaction product and a catalyst can be easily separated by using a hydrofluorocarbon compound as an extracting solvent.

The invention claimed is:

1. A process for the recovery of a catalyst in a reaction comprising boron trifluoride or its complex as the catalyst, the process comprising:
   separating a reaction product and a reaction solvent after completion of the reaction,
   wherein the reaction solvent consists of a hydrofluorocarbon compound and/or an oxygenic hydrofluorocarbon compound.

2. The process for the recovery according to claim 1, wherein the reaction solvent consists of a hydrofluorocarbon compound and/or an oxygenic hydrofluorocarbon compound with no ozone-depleting potential.

3. The process for the recovery according to claim 1, wherein the reaction solvent consists of a hydrofluorocarbon compound having an ether linkage.

4. The process for the recovery according to claim 1, wherein the reaction solvent consists of a hydrofluorocarbon compound and/or an oxygenic hydrofluorocarbon, and a fluorine compound with the specific gravity of 1.1 or more.

5. The process for the recovery according to claim 1, wherein the hydrofluorocarbon compound consists of a compound expressed by a composition formula $C_nH_mF_{2n-m+2}$ (n=3 to 12, and m=1 to 2n), or a cyclic perfluorocarbon compound with the number of carbon atoms of 12 or less in which fluorine atoms are partially substituted by hydrogen atoms.

6. The process for the recovery according to claim 1, wherein the oxygenic hydrofluorocarbon compound consists of a compound expressed by a composition formula $C_nH_mF_{2n-m+2}O$ (n=3 to 12, and m=1 to 2n), or an oxygenic cyclic perfluorocarbon compound with the number of carbon atoms of 12 or less in which fluorine atoms are partially substituted by hydrogen atoms.

7. The process for the recovery according to claim 1, wherein a complexing agent that forms a complex with boron trifluoride in the boron trifluoride complex comprises a polar compound.

8. The process for the recovery according to claim 7, wherein the complexing agent is selected from a group consisting of water, alcohols, ethers, phenols, amines, ketones, aldehydes, esters, acid anhydrides, and acids.

9. The process for the recovery according to claim 1, wherein the boron trifluoride complex consists of a boron trifluoride-ether complex.

10. The process for the recovery according to claim 1, wherein the reaction comprising boron trifluoride or its complex as a catalyst is a dimerization reaction, an oligomerization reaction, a condensation reaction, or a polymerization reaction of an olefin.

11. A process for recycling a catalyst recovered from a reaction, the process comprising:
    adding the catalyst recovered by the process according to any claims 1 to 10 to the reaction.

12. A process for the recovery of a catalyst in a reaction comprising boron trifluoride or its complex as a catalyst, the process comprising:
    extracting boron trifluoride or its complex from a reaction product after completion of the reaction,
    wherein an extracting solvent for the extraction consists of a hydrofluorocarbon compound and/or an oxygenic hydrofluorocarbon compound.

13. The process for the recovery according to claim 12, wherein, after boron trifluoride or its complex is extracted from the reaction product, the extract is separated into an extracting solvent and boron trifluoride or its complex by distillation.

14. The process for the recovery according to claim 12, wherein the extracting solvent consists of a hydrofluorocarbon compound and/or an oxygenic hydrofluorocarbon compound with no ozone-depleting potential.

15. The process for the recovery according to claim 12, wherein the extracting solvent consists of a hydrofluorocarbon compound and/or an oxygenic hydrofluorocarbon, and a fluorine compound with the specific gravity of 1.1 or more.

16. The process for the recovery according to claim 12, wherein the hydrofluorocarbon compound consists of a compound expressed by a composition formula $C_nH_mF_{2n-m+2}$ (n=3 to 12, and m=1 to 2n), or a cyclic perfluorocarbon compound with the number of carbon atoms of 12 or less in which fluorine atoms are partially substituted by hydrogen atoms.

17. The process for the recovery according to claim 12, wherein the oxygenic hydrofluorocarbon compound consists of a compound expressed by a composition formula $C_nH_mF_{2n-m+2}O$ (n=3 to 12, and m=1 to 2n), or an oxygenic cyclic perfluorocarbon compound with the number of carbon atoms of 12 or less in which fluorine atoms are partially substituted by hydrogen atoms.

18. The process for the recovery according to claim 12, wherein the extracting solvent consists of a hydrofluorocarbon compound having an ether linkage.

19. The process for the recovery according to claim 12, wherein the complexing agent that forms a complex with boron trifluoride in the boron trifluoride complex comprises a polar compound.

20. The process for the recovery according to claim 19, wherein the complexing agent is selected from a group consisting of water, alcohols, ethers, phenols, amines, ketones, aldehydes, esters, acid anhydrides, and acids.

21. The process for the recovery according to claim 12, wherein the boron trifluoride complex consists of a boron trifluoride-ether complex.

22. The process for the recovery according to claim 12, wherein the reaction comprising boron trifluoride or its complex as a catalyst is a dimerization reaction, an oligomerization reaction, a condensation reaction, or a polymerization reaction of an olefin.

23. A process for recycling a catalyst recovered from a reaction, the process comprising:

adding the catalyst recovered by the process according to any claims 12 to 19 to the reaction.

* * * * *